United States Patent
Kaneoka et al.

(10) Patent No.: US 10,374,717 B2
(45) Date of Patent: Aug. 6, 2019

(54) SIGNAL PROCESSING DEVICE, TRANSMITTING AND RECEIVING DEVICE, AND SIGNAL PROCESSING METHOD

(71) Applicant: FUJITSU LIMITED, Kawasaki-shi, Kanagawa (JP)

(72) Inventors: Tomohiro Kaneoka, Kawasaki (JP); Hiroshi Ogiwara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/015,681

(22) Filed: Jun. 22, 2018

(65) Prior Publication Data
US 2018/0375582 A1    Dec. 27, 2018

(30) Foreign Application Priority Data

Jun. 26, 2017    (JP) .................................. 2017-124401

(51) Int. Cl.
   *H04B 10/40*    (2013.01)
(52) U.S. Cl.
   CPC .................................. *H04B 10/40* (2013.01)
(58) Field of Classification Search
   CPC .................................................... H04B 10/40
   USPC .......................................................... 398/136
   See application file for complete search history.

(56) References Cited

U.S. PATENT DOCUMENTS

| | | | | |
|---|---|---|---|---|
| 6,446,867 B1 * | 9/2002 | Sanchez | ............... | G01R 31/002 235/454 |
| 7,499,616 B2 * | 3/2009 | Aronson | ............... | G02B 6/4249 385/100 |
| 2011/0206382 A1 * | 8/2011 | Elselt | ................. | H04B 10/2507 398/159 |
| 2011/0299858 A1 * | 12/2011 | Mazzini | ............... | H04B 10/516 398/183 |
| 2013/0308953 A1 * | 11/2013 | Hopkins | ............ | H04B 10/2507 398/115 |
| 2015/0110502 A1 * | 4/2015 | Hosking | ............... | H04B 10/564 398/182 |
| 2016/0006513 A1 * | 1/2016 | El-Ahmadi | ........... | H04L 7/0075 398/98 |
| 2017/0012709 A1 * | 1/2017 | Duthel | ................. | H04B 10/278 |
| 2018/0109348 A1 * | 4/2018 | Salsi | ................. | H04B 10/07955 |

FOREIGN PATENT DOCUMENTS

| | | |
|---|---|---|
| JP | 10-327209 | 12/1998 |
| JP | 2005-347916 | 12/2005 |

* cited by examiner

*Primary Examiner* — Dalzid E Singh
(74) *Attorney, Agent, or Firm* — Fujitsu Patent Center (57) ABSTRACT

A signal processing device includes an electric connector to which a transmitting and receiving device, which transmits and receives a signal, is connectable; a first processor configured to compensate for, according to a setting value, deterioration of the signal input and output between the signal processing device and the transmitting and receiving device via the electric connector; a memory configured to store first characteristic data indicating a transmission characteristic of the signal in the electric connector; and a second processor configured to acquire, from the transmitting and receiving device, second characteristic data for indicating a transmission characteristic of the signal in the transmitting and receiving device and set the setting value in the first processor based on the first characteristic data and the second characteristic data.

16 Claims, 5 Drawing Sheets

| Xi AMPLITUDE VALUE |
| Xi PHASE |
| Yi AMPLITUDE VALUE |
| Yi PHASE |
| Xq AMPLITUDE VALUE |
| Xq PHASE |
| Yq AMPLITUDE VALUE |
| Yq PHASE |
| Tx SIDE Xi-Yi SKEW |
| Tx SIDE Xi-Xq SKEW |
| Tx SIDE Yi-Yq SKEW |
| Rx SIDE Xi-Yi SKEW |
| Rx SIDE Xi-Xq SKEW |
| Rx SIDE Yi-Yq SKEW |

SIGNAL PROCESSING DEVICE, TRANSMITTING AND RECEIVING DEVICE, AND SIGNAL PROCESSING METHOD

CROSS-REFERENCE TO RELATED APPLICATION

This application is based upon and claims the benefit of priority of the prior Japanese Patent Application No. 2017-124401, filed on Jun. 26, 2017, the entire contents of which are incorporated herein by reference.

FIELD

The embodiment discussed herein is related to a signal processing device, a transmitting and receiving device, and a signal processing method.

BACKGROUND

According to the increase in demands for large-capacity data transmission, for example, a transmission device of a digital coherent optical transmission scheme for enabling transmission at 100 (Gbps) or more with one wavelength light is used. As an optical transmission and reception module corresponding to the digital coherent optical transmission scheme, there is, for example, 100 gigabit form-factor pluggable (CFP)2-analog coherent optics (ACO).

The optical transmission and reception module of this type is detachably connected to, via an electric connector, a host module included in a transmission device body. In the host module, a compensation circuit such as an equalizer (see, for example, Japanese Laid-open Patent Publication Nos. 10-327209 and 2005-347916) is provided to compensate for deterioration of signals input and output between the host module and the optical transmission and reception module via the electric connector.

A filter coefficient of an electric filter such as a finite impulse response (FIR) filter configuring the equalizer is adjusted, for example, during manufacturing of the host module, in a state in which the host module is connected to an optical transmission and reception module for inspection.

However, a transmission characteristic of the signals input and output between the host module and the optical transmission and reception module is different depending on not only a combination of module types of the host module and the optical transmission and reception module but also a combination of individual characteristics of the host module and the optical transmission and reception module due to fluctuation during the manufacturing. For example, a skew of a signal changes according to the length of a wire for the signal passing the electric connector.

Therefore, depending on a combination of the host module and the optical transmission and reception module connected to each other, it is likely that a signal transmission characteristic does not satisfy a predetermined standard because the adjusted electric filter is inappropriate.

SUMMARY

According to an aspect of the embodiments, a signal processing device includes an electric connector to which a transmitting and receiving device, which transmits and receives a signal, is connectable; a first processor configured to compensate for, according to a setting value, deterioration of the signal input and output between the signal processing device and the transmitting and receiving device via the electric connector; a memory configured to store first characteristic data indicating a transmission characteristic of the signal in the electric connector; and a second processor configured to acquire, from the transmitting and receiving device, second characteristic data indicating a transmission characteristic of the signal in the transmitting and receiving device and set the setting value in the first processor based on the first characteristic data and the second characteristic data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
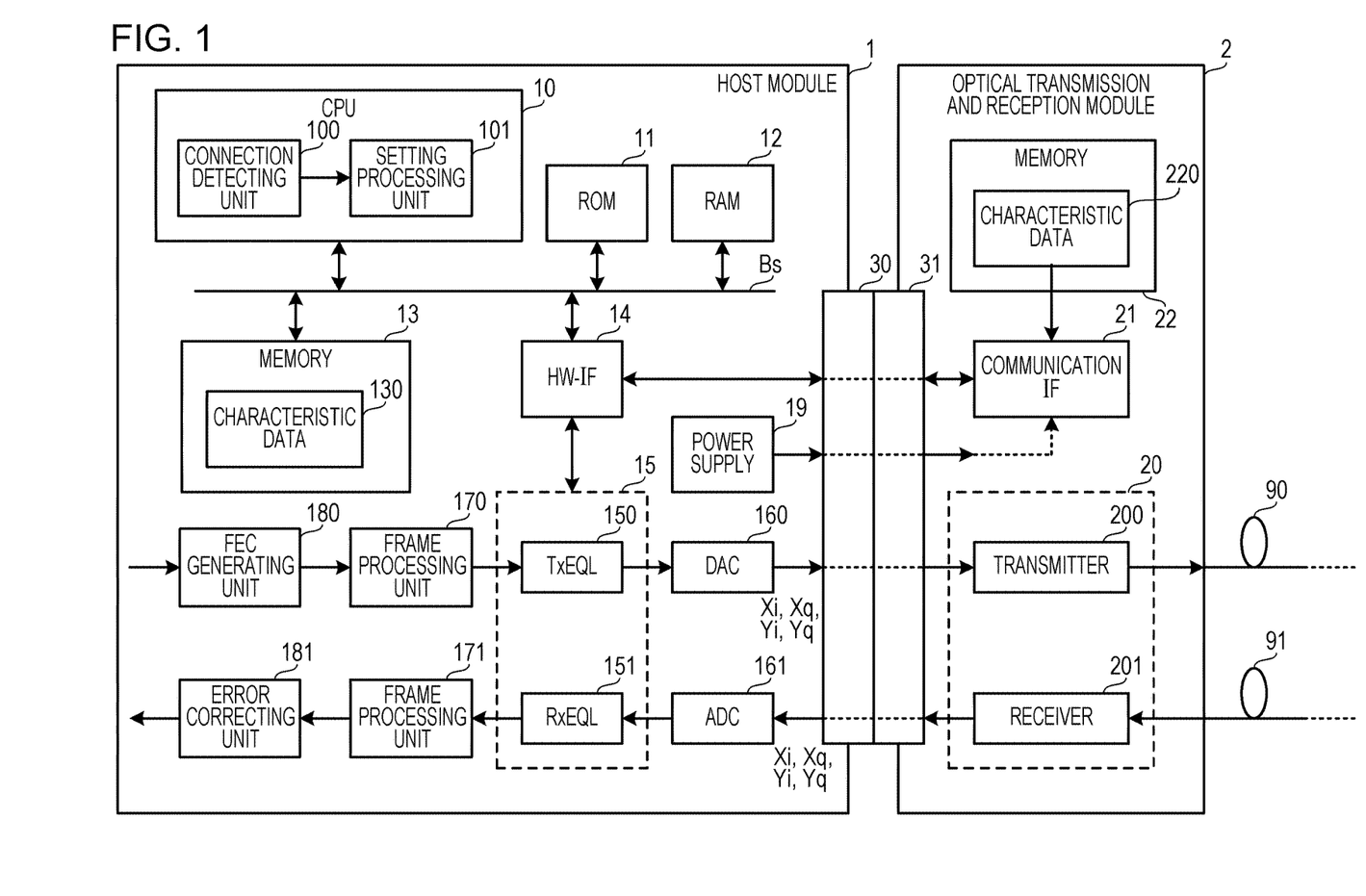
FIG. 1 is a configuration diagram illustrating an example of a host module and an optical transmission and reception module.

FIG. 1 is a configuration diagram illustrating an example of a host module 1 and an optical transmission and reception module 2. The host module 1 is an example of a signal processing device and is configured from, for example, a circuit board mounted on a transmission device. The optical transmission and reception module 2 is detachably connected to the host module 1. The optical transmission and reception module 2 is an example of a transmitting and receiving device connectable to the host module 1. Note that examples of the optical transmission and reception module 2 include a CFP2-ACO. However, the optical transmission and reception module 2 is not limited to the CFP2-ACO.

An electric connector 30 is provided in the host module 1. An electric connector 31 is provided in the optical transmission and reception module 2. The host module 1 and the optical transmission and reception module 2 are connected to each other via the electric connectors 30 and 31. Note that the electric connector 30 is an example of a first electric connector and is connectable to the optical transmission and reception module 2. The electric connector 31 is an example of a second electric connector. The electric connector 31 connects the optical transmission and reception module 2 to the host module 1.

The host module 1 and the optical transmission and reception module 2 perform transmission processing of an optical signal according to, for example, a digital coherent optical transmission scheme. Data signals Xi, Xq, Yi, and Yq are input to and output from the host module 1 and the optical transmission and reception module 2 via the electric connectors 30 and 31. The data signals Xi and Xq are electric signals corresponding to an X-polarized component of the optical signal. The data signals Yi and Yq are electric signals corresponding to a Y-polarized component of the optical signal.

The optical transmission and reception module 2 converts the data signals Xi, Xq, Yi, and Yq from electric signals into optical signals and converts the optical signals into data signals. The optical transmission and reception module 2 transmits and receives the optical signals between the optical transmission and reception module 2 and transmission paths 90 and 91 such as optical fibers 9. The configurations of the host module 1 and the optical transmission and reception module 2 are explained below. Note that, in the following explanation, a transmission direction of the data signals Xi, Xq, Yi, and Yq transmitted from the host module 1 to the optical transmission and reception module 2 is represented as "transmitting direction" and a transmission direction of the data signals Xi, Xq, Yi, and Yq transmitted from the optical transmission and reception module 2 to the host module 1 is represented as "receiving direction".

The optical transmission and reception module 2 includes an optical transceiver 20, a communication interface unit (a communication IF) 21, a memory 22, and the electric connector 31. The optical transceiver 20 includes a transmitter 200 that transmits an optical signal to the transmission path 90 and a receiver 201 that receives an optical signal from the transmission path 91. Note that the optical signal includes, for example, multiplexed light of an X-polarized component and a Y-polarized component obtained by optical modulation of the data signals Xi, Xq, Yi, and Yq.

The data signals Xi, Xq, Yi, and Yq are input to the transmitter 200 from the host module 1 via the electric connectors 30 and 31. The transmitter 200 is configured from, for example, a laser diode and a modulator. The transmitter 200 converts the data signals Xi, Xq, Yi, and Yq in the transmitting direction from electric signals into optical signals.

The receiver 201 is configured from a photodiode, an optical beam splitter, and the like. The receiver 201 converts the data signals Xi, Xq, Yi, and Yq in the receiving direction input from the transmission path 91 from optical signals into electric signals. The receiver 201 outputs the data signals Xi, Xq, Yi, and Yq in the receiving direction to the host module 1 via the electric connectors 30 and 31.

In this way, the data signals Xi, Xq, Yi, and Yq are input and output between the optical transceiver 20 and the host module 1 via the electric connectors 30 and 31. The optical transceiver 20 transmits and receives the data signals Xi, Xq, Yi, and Yq converted into the optical signals between the optical transceiver 20 and the transmission paths 90 and 91. Note that the optical transceiver 20 is an example of a transmission and reception circuit.

The communication IF 21 processes communication between the host module 1 and the optical transmission and reception module 2. More specifically, when power supply is started from the host module 1 to the optical transmission and reception module 2 via the electric connectors 30 and 31 according to connection of the electric connectors 30 and 31, the communication IF 21 notifies startup of the optical transmission and reception module 2 to the host module 1. At this time, the communication IF 21 outputs a startup notification signal to the host module 1. Note that the communication IF 21 is configured by a processor. The processor may be configured by a logic circuit such as an FPGA.

The memory 22 is an example of a storing unit of the transmitting and receiving device. The memory 22 stores characteristic data 220 indicating a transmission characteristic of the data signals Xi, Xq, Yi, and Yq in the electric connector 31. More specifically, the characteristic data 220 indicates, for example, a transmission characteristic at the time when the optical transmission and reception module 2 is connected to a predetermined test device, that is, a transmission characteristic of the data signals Xi, Xq, Yi, and Yq of the optical transmission and reception module 2 alone rather than a transmission characteristic at the time when the optical transmission and reception module 2 is connected to a specific host module 1. Note that the characteristic data 220 is an example of second characteristic data. Content of the characteristic data 220 is explained below.

After the notification of the startup, the communication IF 21 reads out the characteristic data 220 from the memory 22 in response to an access from the host module 1 and outputs the characteristic data 220 to the host module 1 via the electric connectors 30 and 31. That is, the communication IF 21 is an example of an output unit and an output circuit. The communication IF 21 outputs the characteristic data 220 to the host module 1.

The host module 1 includes a compensating unit 15, a power supply 19, the electric connector 30, a digital-analog conversion unit (DAC) 160, an analog-digital conversion unit 161, frame processing units 170 and 171, an error correcting unit 181, and a forward error correction (FEC) generating unit 180. The compensating unit 15, the DAC 160, the ADC 161, the frame processing units 170 and 171, the error correcting unit 181, and the FEC generating unit 180 are configured as a processor. The processor is configured by, for example, a digital signal processor (DSP). However, the processor may be configured by a logic circuit such as a field programmable gate array (FPGA).

When the optical transmission and reception module 2 is connected to the electric connector 30, the power supply 19 supplies electric power to the optical transmission and reception module 2 via the electric connectors 30 and 31.

Functions in the transmitting direction are explained. The FEC generating unit 180 generates an FEC as an error correction code from, for example, a frame signal input from another host module 1 of a transmission device. Note that examples of a form of the frame signal include an optical transport network (OTN) frame specified by the International Telecommunication Union Telecommunication Standardization Sector (ITU-T) recommendation G.709. However, the form of the frame signal is not limited to the OTN frame. The FEC generating unit 180 gives the FEC to the frame signal and outputs the frame signal to the frame processing unit 170.

The frame processing unit 170 stores the frame signal in, for example, a predetermined frame and outputs the frame signal to the compensating unit 15 as the data signals Xi, Xq, Yi, and Yq.

The compensating unit 15 includes a transmission side equalizer (TxEQL) 150 and a reception side equalizer (RxEQL) 151. The TxEQL 150 compensates for, according to a setting value, deterioration of the data signals Xi, Xq, Yi, and Yq input from the frame processing unit 170. The data signals Xi, Xq, Yi, and Yq after the compensation are output to the DAC 160.

The DAC 160 converts the data signals Xi, Xq, Yi, and Yq from digital signals into analog signals and outputs the data signals Xi, Xq, Yi, and Yq to the optical transmission and reception module 2 via the electric connectors 30 and 31. The DAC 160 is an example of a first conversion circuit. The DAC 160 converts the data signals Xi, Xq, Yi, and Yq input to the electric connector 30 from digital signals into analog signals. The data signals Xi, Xq, Yi, and Yq in the transmitting direction are input to the transmitter 200 in the optical transmission and reception module 2.

Functions in the receiving direction are explained. The data signals Xi, Xq, Yi, and Yq, which are analog signals, are input from the receiver 201 in the optical transmission and reception module 2 to the ADC 161 via the electric connectors 30 and 31. The ADC 161 converts the data signals Xi, Xq, Yi, and Yq from the analog signals into digital signals and outputs the data signals Xi, Xq, Yi, and Yq to the RxEQL 151. The ADC 161 is an example of a second conversion circuit. The ADC 161 converts the data signals Xi, Xq, Yi, and Yq output from the electric connector 30 from the analog signals into digital signals.

The RxEQL 151 compensates for, according to a setting value, deterioration of the data signals Xi, Xq, Yi, and Yq input from the ADC 161. The data signals Xi, Xq, Yi, and Yq after the compensation are output to the frame processing unit 171. The frame processing unit 171 generates a predetermined frame signal (for example, an OTN frame) from the data signals Xi, Xq, Yi, and Yq and outputs the predetermined frame signal to the error correcting unit 181.

The error correcting unit 181 corrects, based on the FEC given to the frame signal, an error of the frame signal. The frame signal after the error correction is output to, for example, the other host module 1 of the transmission device.

The host module 1 includes a central processing unit (CPU) 10, a read only memory (ROM) 11, a random-access memory (RAM) 12, a memory 13, and a hardware interface (HW-IF) 14. The CPU 10 is connected to the ROM 11, the RAM 12, the memory 13, and the HW-IF 14 via a bus Bs such that the CPU 10 and the ROM 11, the RAM 12, the memory 13, and the HW-IF 14 may be able to input and output signals each other.

A computer program for driving the CPU 10 is stored in the ROM 11. The computer program includes, for example, an operating system (OS) and software for executing a signal processing method. The RAM 12 functions as a working memory of the CPU 10.

The memory 13 is an example of a storing unit of the signal processing device. The memory 13 stores characteristic data 130 indicating a transmission characteristic of the data signals Xi, Xq, Yi, and Yq in the electric connector 30. More specifically, the characteristic data 130 indicates, for example, a transmission characteristic at the time when the host module 1 is connected to the predetermined test device, that is, a transmission characteristic of the data signals Xi, Xq, Yi, and Yq of the host module 1 alone rather than a transmission characteristic at the time when the host module 1 is connected to a specific optical transmission and receptor module 2. Note that the characteristic data 130 is an example of first characteristic data. Content of the characteristic data 130 is explained below.

The HW-IF 14 processes communication between the CPU 10 and the optical transmission and reception module 2 and the compensating unit 15. The HW-IF 14 is configured by a processor. The processor is configured from a logic circuit such as an FPGA. The processor connects the optical transmission and reception module 2 or the compensating unit 15 to the CPU 10 via the bus Bs according to control by the CPU 10.

When the CPU 10 reads the computer program from the ROM 11, a connection detecting unit 100 and a setting processing unit 101 are formed as functions. Note that the connection detecting unit 100 and the setting processing unit 101 may be formed as a logic circuit such as an FPGA rather than as a function of software.

When the electric connectors 30 and 31 are connected to each other, the connection detecting unit 100 receives a startup notification signal from the communication IF 21 of the optical transmission and reception module 2 to thereby detect connection of the optical transmission and reception module 2 to the electric connector 30. The connection detecting unit 100 notifies the detection of the connection of the optical transmission and reception module 2 to the setting processing unit 101.

The setting processing unit 101 acquires the characteristic data 220 from the memory 22 of the optical transmission and reception module 2 via the electric connectors 30 and 31 according to the notification of the detection of the connection from the connection detecting unit 100. More specifically, the setting processing unit 101 accesses the memory 22 of the optical transmission and reception module 2 via the HW-IF 14 and the communication IF 21 to thereby read out the characteristic data 220 from the memory 22.

In this way, the setting processing unit 101 acquires the characteristic data 220 via the electric connector 30 to and from which the data signals Xi, Xq, Yi, and Yq are input and output. Therefore, a communication path between the host module 1 and the optical transmission and reception module 2 is further simplified than when the characteristic data 220 is acquired via a communication path different from the electric connector 30.

Before or after the acquisition of the characteristic data 220, the setting processing unit 101 reads out the characteristic data 130 from the memory 13 of the host module 1. That is, the setting processing unit 101 acquires the characteristic data 220 from the optical transmission and reception module 2 and acquires the characteristic data 130 from the host module 1.

The setting processing unit 101 sets, based on the characteristic data 130 and 220, in the compensating unit 15, a setting value concerning compensation for deterioration of the data signals Xi, Xq, Yi, and Yq. An example of the characteristic data 130 and 220 is explained below.

Figure 2:
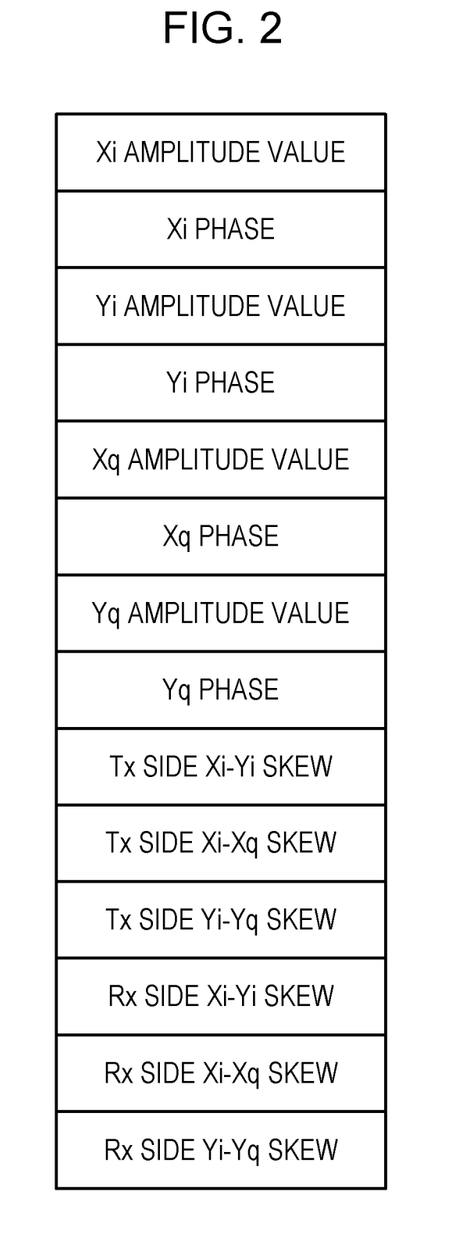
FIG. 2 is a diagram illustrating an example of characteristic data.

FIG. 2 is a diagram illustrating an example of the characteristic data 130 and 220. The characteristic data 130 and 220 are used as calibration data for deterioration compensation of the data signals Xi, Xq, Yi, and Yq between the host module 1 and the optical transmission and receptor module 2. The characteristic data 130 and 220 include, for example, a frequency characteristic and a skew characteristic of the data signals Xi, Xq, Yi, and Yq transmitted to the electric connectors 30 and 31.

More specifically, the characteristic data 130 of the host module 1 includes characteristic values or compensation values of amplitudes, phases, skews, and the like of the data signals Xi, Xq, Yi, and Yq transmitted to the electric connector 30. The characteristic data 220 of the optical transmission and reception module 2 includes characteristic values or compensation values of amplitudes, phases, skews, and the like of the data signals Xi, Xq, Yi, and Yq transmitted to the electric connector 31.

For example, an Xi amplitude value indicates amplitude of the data signal Xi and a Yq amplitude value indicates amplitude of the data signal Yq. An Xq phase indicates a phase of the data signal Xq and a Yi phase indicates a phase of the data signal Yi. Further, a Tx-side Xi-Yi skew indicates a skew between the data signals Xi and Yi on the transmission side and an Rx-side Xi-Xq skew indicates a skew between the data signals Xi and Xq on the reception side.

As explained above, the characteristic data 130 and 220 indicate individual transmission characteristics at the time when the host module 1 and the optical transmission and reception module 2 are separately connected to the predetermined test device rather than transmission characteristics at the time when the host module 1 and the optical transmission and reception module 2 are connected. The characteristic data 130 and 220 are written in the respective memories 13 and 22, for example, during manufacturing of the host module 1 and the optical transmission and reception module 2.

Referring back to FIG. 1, the setting processing unit 101 sets setting values of the TxEQL 150 and the RxEQL 151 from the characteristic data 130 and 220 (that is, the characteristic values or the compensation values) via the HW-IF 14. More specifically, the setting processing unit 101 calculates setting values from the characteristic data 130 and 220 and outputs the setting values to the TxEQL 150 and the RxEQL 151.

Examples of the setting values include adjustment amounts of amplitudes, phases, and skews of the data signals Xi, Xq, Yi, and Yq. However, the setting values are not limited to the adjustment amounts. The TxEQL 150 and the RxEQL 151 compensate for, based on the setting values, deterioration of the data signals Xi, Xq, Yi, and Yq. Note that examples of the deterioration of the data signals Xi, Xq, Yi, and Yq include a skew and a waveform distortion. However, the deterioration of the data signals Xi, Xq, Yi, and Yq is not limited to the skew and the waveform distortion.

Figure 3:
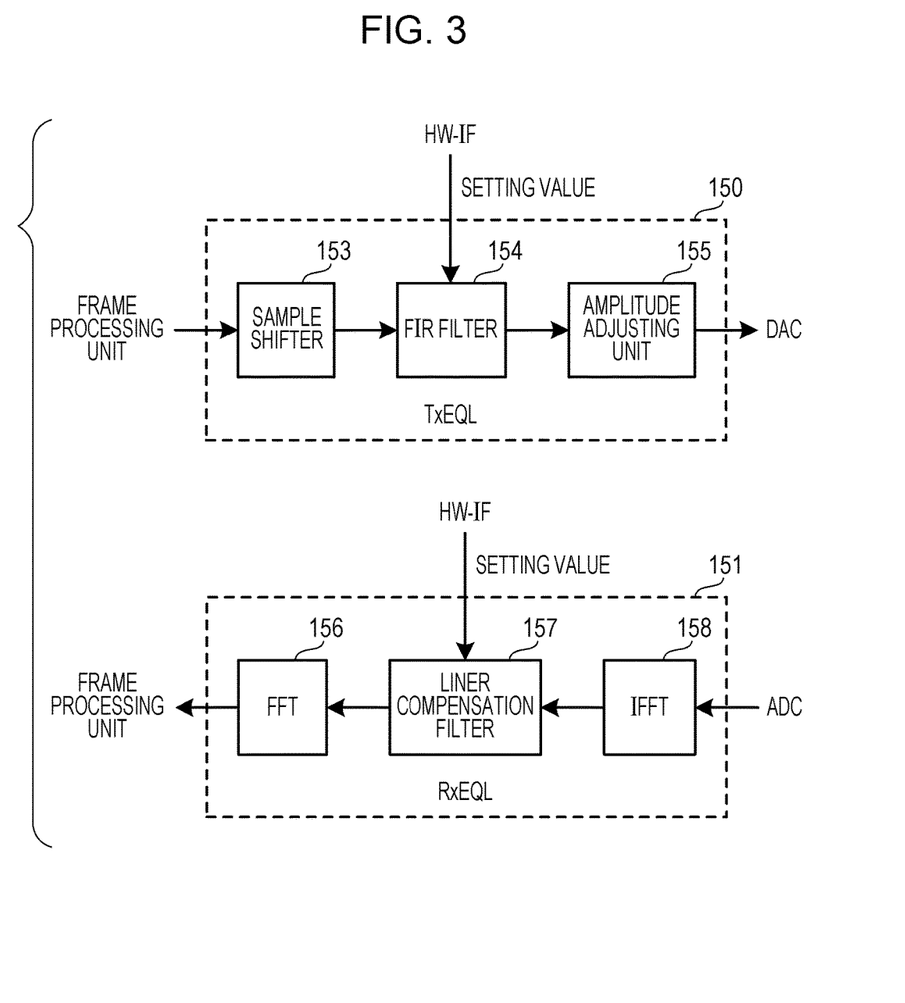
FIG. 3 is a configuration diagram illustrating an example of an equalizer.

FIG. 3 is a configuration diagram illustrating an example of the TxEQL 150 and the RxEQL 151. The TxEQL 150 includes a sample shifter 153, a finite impulse response (FIR) filter 154, and an amplitude adjusting unit 155.

The sample shifter 153 phase-shifts the data signals Xi, Xq, Yi, and Yq for each of lanes. The sample shifter 153 outputs the phase-shifted data signals Xi, Xq, Yi, and Yq to the FIR filter 154.

The FIR filter 154 includes a plurality of (for example, nine) taps and compensates for, for example, skews of the data signals Xi, Xq, Yi, and Yq for each of the lanes. An FIR filter coefficient is calculated based on the setting values and set in the FIR filter 154. The data signals Xi, Xq, Yi, and Yq are input from the FIR filter 154 to the amplitude adjusting unit 155.

The amplitude adjusting unit 155 adjusts amplitude values of the data signals Xi, Xq, Yi, and Yq. The amplitude adjusting unit 155 outputs the data signals Xi, Xq, Yi, and Yq, the amplitude values of which are adjusted, to the DAC 160.

In this way, the TxEQL 150 compensates for deterioration of the data signals Xi, Xq, Yi, and Yq input to the DAC 160. Therefore, the TxEQL 150 may be able to compensate for the deterioration of the data signals Xi, Xq, Yi, and Yq according to digital processing.

The RxEQL 151 includes a fast Fourier transform (FFT) 156, a linear compensation filter 157, and an inverse fast Fourier transform (IFFT) 158. The IFFT 158 converts the data signals Xi, Xq, Yi, and Yq input from the ADC 161 from signals in a frequency domain into signals in a time domain.

The linear compensation filter 157 compensates for, for example, skews of the data signals Xi, Xq, Yi, and Yq for each of the lanes. A linear compensation filter coefficient is calculated based on a setting value and set in the linear compensation filter 157. The data signals Xi, Xq, Yi, and Yq are input to the FFT 156 from the linear compensation filter 157. The FFT 156 converts the data signals Xi, Xq, Yi, and Yq input from the linear compensation filter 157 from signals in the time domain into signals in the frequency domain.

In this way, the RxEQL 151 compensates for deterioration of the data signals Xi, Xq, Yi, and Yq output from the ADC 161. Therefore, the RxEQL 151 may be able to compensate for the deterioration of the data signals Xi, Xq, Yi, and Yq according to digital processing.

As explained above, the TxEQL 150 and the RxEQL 151 respectively compensate for the deterioration of the data signals Xi, Xq, Yi, and Yq according to the setting values set by the setting processing unit 101. As explained above, the setting processing unit 101 sets, based on the characteristic data 130 of the host module 1 and the characteristic data 220 of the optical transmission and reception module 2, the setting values.

Therefore, the TxEQL 150 and the RxEQL 151 may be able to respectively optimize the FIR filter coefficient of the FIR filter 154 and the linear compensation filter coefficient of the linear compensation filter 157 according to a combination of the host module 1 and the optical transmission and reception module 2.

Figure 4:
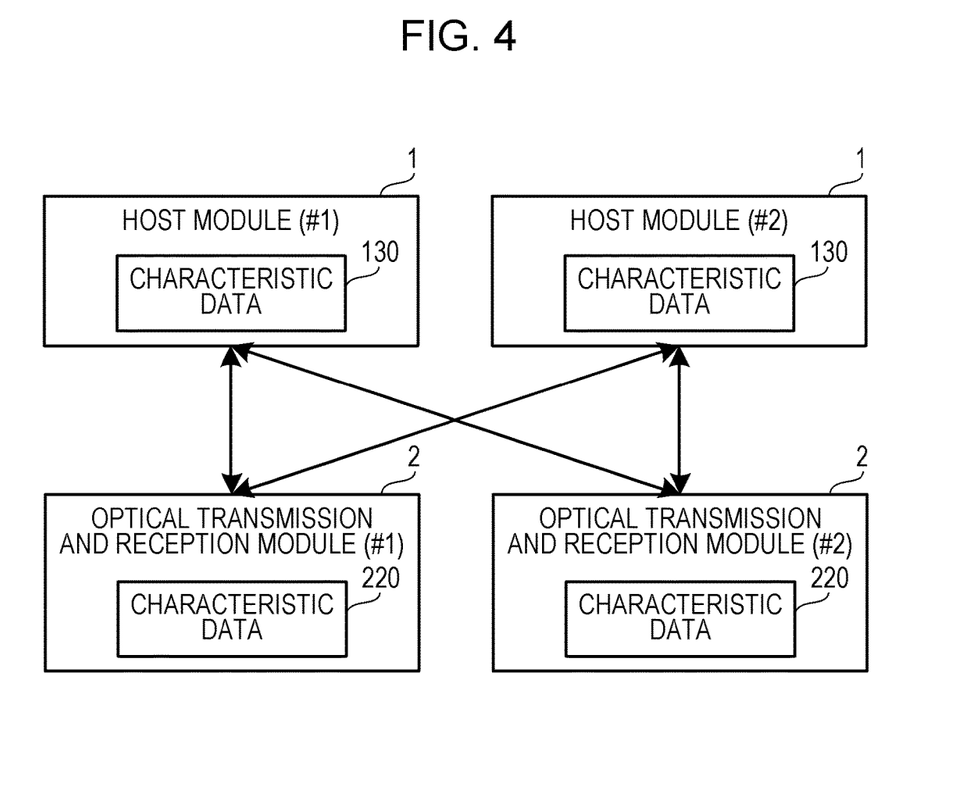
FIG. 4 is a diagram illustrating an example of a combination of the host module and the optical transmission and reception module.

FIG. 4 is a diagram illustrating an example of the combination of the host module 1 and the optical transmission and reception module 2. As an example, it is assumed that a host module (#1) 1 and a host module (#2) 1 are present in the host module 1. It is assumed that an optical transmission and reception module (#1) 2 and an optical transmission and reception module (#2) 2 are present in the optical transmission and reception module 2.

The types (#1 and #2) of the host module 1 and the optical transmission and reception module 2 indicate, for example, device types or types of individual characteristics due to fluctuation during manufacturing. Between the host module 1 and the optical transmission and reception module 2 of different types, for example, skews of the data signals Xi, Xq, Yi, and Yq change according to the lengths of the respective wires passing through the electric connectors 30 and 31.

However, the host module (#1) 1 and the host module (#2) 1 retain the individual characteristic data 130 and the optical transmission and reception module (#1) 2 and the optical transmission and reception module (#2) 2 retain the individual characteristic data 220. Therefore, the host module (#1) 1 and the host module (#2) 1 may be able to optimize, based on a combination of the characteristic data 130 and 220 corresponding to a type of the optical transmission and reception module 2 at a connection destination, the FIR filter coefficient of the FIR filter 154 and the linear compensation filter coefficient of the linear compensation filter 157.

Therefore, the host module 1 may be able to transmit the data signals Xi, Xq, Yi, and Yq with a satisfactory transmission characteristic irrespective of the optical transmission and reception module 2 at a connection destination.

The setting processing unit 101 sets, based on a notification from the connection detecting unit 100, a setting value according to connection of the optical transmission and reception module 2 to the electric connector 30. Therefore, taking the connection of the host module 1 and the optical transmission and receptor module 2 as an opportunity, the FIR filter coefficient of the FIR filter 154 and the linear compensation filter coefficient of the linear compensation filter 157 are conveniently automatically optimized.

In the optical transmission and reception module 2, after the power supply is started from the host module 1 to the optical transmission and reception module 2 via the electric connectors 30 and 31, the communication IF 21 outputs the characteristic data 220 to the host module 1. Therefore, the same effects as the effects explained above are obtained.

A signal processing method by the host module 1 is explained.

Figure 5:
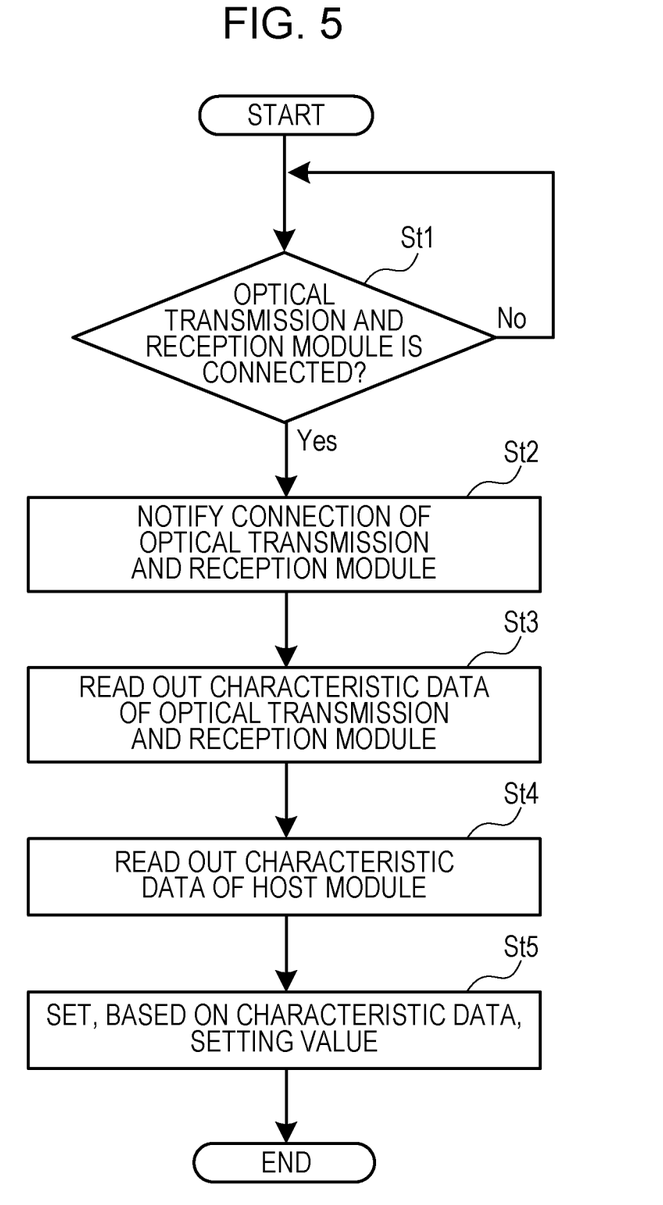
FIG. 5 is a flowchart illustrating an example of a signal processing method.

FIG. 5 is a flowchart illustrating an example of the signal processing method. The signal processing method is executed by the CPU 10 functioning as a processor. However, the signal processing method may be executed by a logic circuit such as an FPGA instead of the CPU 10.

The connection detecting unit 100 determines, based on presence or absence of the startup notification signal from the communication IF 21, whether the optical transmission and reception module 2 is connected to the electric connector 30 (step St1). As explained above, when electric power is supplied from the power supply 19 of the host module 1 to the optical transmission and reception module 2, the startup notification signal is output from the communication IF 21 to the CPU 10 via the electric connectors 30 and 31.

When the optical transmission and reception module 2 is not connected (No in step St1), the connection detecting unit 100 executes the processing in step St1 again.

When the optical transmission and reception module 2 is connected (Yes in step St1), the connection detecting unit 100 notifies the connection to the setting processing unit 101 (step St2). The setting processing unit 101 reads out the characteristic data 220 from the memory 22 of the optical transmission and reception module 2 via the electric connectors 30 and 31 (step St3). That is, the setting processing unit 101 acquires the characteristic data 220 from the optical transmission and reception module 2.

At this time, the characteristic data 220 is read out via the electric connectors 30 and 31 common to the data signals Xi, Xq, Yi, and Yq. Therefore, it is unnecessary to prepare another electric connector for the readout of the characteristic data 220.

Subsequently, the setting processing unit 101 reads out the characteristic data 130 from the memory 13 of the host module 1 (step St4). That is, the setting processing unit 101 acquires the characteristic data 220 from the host module 1.

Subsequently, the setting processing unit 101 sets a setting value in the compensating unit 15 based on the characteristic data 130 and 220 (step St5). Consequently, the setting processing unit 101 may be able to optimize the FIR filter coefficient of the FIR filter 154 and the linear compensation filter coefficient of the linear compensation filter 157 according to the combination of the host module 1 and the optical transmission and reception module 2. In this way, the signal processing method is executed.

According to the signal processing method, as explained above, the host module 1 may be able to transmit the data signals Xi, Xq, Yi, and Yq with a satisfactory transmission characteristic irrespective of the optical transmission and reception module 2 at the connection destination. The setting processing unit 101 may be able to automatically set, based on the notification from the connection detecting unit 100, a setting value according to the connection of the optical transmission and reception module 2 to the electric connector 30.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A signal processing device comprising:
    an electric connector to which a transmitting and receiving device, which transmits and receives a signal, is connectable;
    a first processor configured to compensate for, according to a setting value, deterioration of the signal input and output between the signal processing device and the transmitting and receiving device via the electric connector;
    a memory configured to store first characteristic data indicating a transmission characteristic of the signal in the electric connector; and
    a second processor configured to acquire, from the transmitting and receiving device, second characteristic data indicating a transmission characteristic of the signal in the transmitting and receiving device and set the setting value in the first processor based on the first characteristic data and the second characteristic data.

2. The signal processing device according to claim 1, wherein the second processor acquires the second characteristic data from the transmitting and receiving device via the electric connector.

3. The signal processing device according to claim 1, wherein the second processor sets the setting value according to the connection of the transmitting and receiving device to the electric connector.

4. The signal processing device according to claim 1, further comprising
    a first conversion circuit configured to convert the signal input to the electric connector from a digital signal into an analog signal, wherein
    the first processor compensates for deterioration of the signal input to the first conversion circuit.

5. The signal processing device according to claim 1, further comprising a second conversion circuit configured to convert the signal output from the electric connector from an analog signal into a digital signal, wherein
    the first processor compensates for deterioration of the signal output from the second conversion circuit.

6. A signal processing method comprising:
    detecting connection of a second electric connector of a transmitting and receiving device, which transmits and receives a signal, to a first electric connector of a signal processing device to which the transmitting and receiving device is connectable;
    acquiring, from the signal processing device, first characteristic data indicating a transmission characteristic of the signal in the first electric connector;
    acquiring, from the transmitting and receiving device, second characteristic data indicating a transmission characteristic of the signal in the second electric connector; and
    setting, based on the first characteristic data and the second characteristic data, a setting value concerning compensation of deterioration of the signal input and output between the signal processing device and the transmitting and receiving device via the first electric connector and the second electric connector.

7. The signal processing method according to claim 6, further comprising acquiring the second characteristic data from the transmitting and receiving device via the first electric connector and the second electric connector.

8. The signal processing method according to claim 6, further comprising:

converting the signal input to the first electric connector from a digital signal into an analog signal with a first conversion circuit; and compensating for deterioration of the signal input to the first conversion circuit.

9. The signal processing method according to claim 6, further comprising:

converting the signal output from the first electric connector from an analog signal into a digital signal with a second conversion circuit; and compensating for deterioration of the signal output from the second conversion circuit.

10. A signal processing device comprising:

a first electric connector configured to connect to a second electric connector of a transmitting and receiving device;

a memory storing first characteristic data of the signal processing device and the first electric connector;

a processor configured to acquire second characteristic data of the transmitting and receiving device and the second connector and to set compensation values based on the first characteristic data and the second characteristic data, the set compensation values compensating for deterioration of a signal communicated between the signal processing device and the transmitting and receiving device.

11. The signal processing device according to claim 10, wherein the first characteristic data is obtained and stored in the memory when the signal processing device and connector are connected to a test device.

12. The signal processing device according to claim 10, further comprising:

a compensation circuit configured to compensate for deterioration of a signal communicated between the signal processing device and the transmitting and receiving device based on the compensation values.

13. The signal processing device according to claim 12, further comprising:

a first conversion circuit configured to covert the signal input to the electric connector from a digital signal into an analog signal, wherein the compensation circuit compensates for deterioration of the signal input to the first conversion circuit.

14. The signal processing device according to claim 13, further comprising:

a second conversion circuit configured to convert the signal output from the electric connector from an analog signal into a digital signal, wherein the compensation circuit compensates for deterioration of the signal output from the second conversion circuit.

15. The signal processing device according to claim 12, wherein the compensation circuit includes a transmission side equalizer and a reception side equalizer, the transmission side equalizer includes
a sample shifter to shift data signals and to output phase-shifted data,
a Finite Impulse Response (FIR) filter to compensate skews output phase-shifted data, and
an amplitude adjusting unit to adjust amplitude values of data filtered by the FIR filter; and the reception side equalizer includes
an inverse fast Fourier transform (IFFY) to convert received data signals from frequency domain to time domain,
a linear compensation filter to filter the time domain signals, and
a fast Fourier transform that converts the filed data signals from the linear compensation filter from the time domain to the frequency domain, wherein the set compensation values optimize the FIR filter and the linear compensation filter.

16. The signal processing device according to claim 10, wherein the first characteristic data includes first skew, first phase and first amplitude for a signal communicated from the signal processing device via the first connector, and the second characteristic data include values of second skew, second phase and second amplitude associated with a signal communicated from the transmitting and receiving device via the second connector.

* * * * *